Jan. 6, 1970   A. L. STINGL   3,487,553

VTOL AIRCRAFT FLIGHT SYSTEM

Filed March 22, 1967

INVENTOR
A. L. STINGL

BY *Sughrue, Rothwell, Mion, Zinn & Macpeak*
ATTORNEYS

United States Patent Office 3,487,553
Patented Jan. 6, 1970

3,487,553
VTOL AIRCRAFT FLIGHT SYSTEM
Alfred L. Stingl, Washington, D.C., assignor to Trans-Meridian International, Inc., Washington, D.C., a corporation of the District of Columbia
Filed Mar. 22, 1967, Ser. No. 625,243
Int. Cl. G01c 19/34
U.S. Cl. 33—204    2 Claims

ABSTRACT OF THE DISCLOSURE

A system for assisting the flying of a vertical take-off and landing aircraft relative to a ship at sea, as in hovering above the ship during transfer of cargo and/or passengers or in actual take-off and landing from the ship's deck or a platform carried on the ship's deck. The system comprises a horizontal reference bar mounted on a portion of the ship visible to the pilot of the VTOL aircraft during hovering or take-off or landing, and means responsive to the roll of the ship for stabilizing the reference bar in a horizontal position, so that the pilot may fly the aircraft in a substantially horizontal attitude by reference to the horizontal bar, regardless of the attitude of the ship. Preferred means for stabilizing the reference bar is a gyro, e.g., either the ship's gyro or an independent gyro, suitably coupled with an amplifier, motor and gear means for moving the reference bar to compensate for the ship's roll. The reference bar is preferably in the form of a T, the horizontal member of which provides the horizontal reference and the vertical leg of which is pivotably mounted and coupled with the gyro, amplifier, motor, and gearing so that it can be moved to compensate for the ship's roll.

BACKGROUND OF THE INVENTION

Field of the invention

The present invention relates to a system for aiding a pilot in flying a VTOL aircraft relative to a ship at sea to facilitate in hovering and landing operations.

Discussion of the prior art

As is well known, ships at sea are more and more being serviced by aircraft, especially VTOL aircraft, as exemplified by helicopters. Helicopters are employed to transfer personnel, mail and cargo. In many cases, the helicopters are also carried aboard naval vessels and are used for anti-submarine warfare and reconnaissance. In conducting transfer operations and in landing on ships at sea, the pilot of the helicopter must hover above a portion of the ship's deck. To accomplish the operation, efficiently and safely, it is desirable that the pilot hover the aircraft in a substantially horizontal attitude. Maintaining the proper horizontal attitude has, however, proved to be extremely difficult due to the roll of the ship and the absence of suitable visual reference for the pilot. Due to the proximity of the ship, he cannot safely take his eyes off the ship to refer to instruments in the cockpit.

It has been therefore the practice of helicopter pilots under such circumstances to pick out a portion of the ship's structure and try to maintain the aircraft in the proper attitude by reference to that external point. However, this has proved to be highly unsatisfactory and in fact dangerous, especially in high seas, due to the movement of the ship's superstructure in response to pitch and roll.

Heretofore there has been no satisfactory system provided to aid the pilot of VTOL aircraft in hovering above and landing on ships at sea.

SUMMARY OF THE INVENTION

The present invention comprises a system for assisting a pilot of a VTOL aircraft in hovering and/or landing on the deck or pad supported on the deck of a ship. According to the invention, a horizontal reference element is mounted on a suitable support which is attached to a portion of the ship's structure. The horizontal reference bar is stabilized in a substantially horizontal position by means responsive to the roll of the ship. The stabilizing means preferably comprises a gyro, such as the ship's gyro or independent gyro, which generates an electric signal in response to roll of the ship. The electric signal is amplified in a suitable amplifier and the output from the amplifier is used to direct an electric motor which, through suitable gearing means, adjusts the position of the horizontal reference bar to compensate for the roll of the ship.

DESCRIPTION OF PREFERRED EMBODIMENTS OF THE INVENTION

Figure 1:
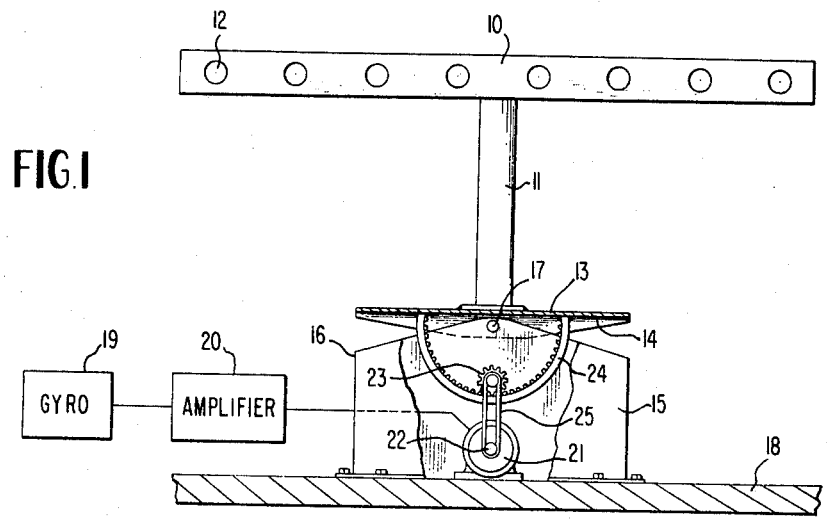
FIGURE 1 is a front view partially in section of a preferred embodiment of the horizontal reference bar which forms a component of the present system.

In a preferred embodiment of the invention, the horizontal reference member or bar is the horizontal portion of a T-form structure. Referring to FIGURE 1 of the drawing, horizontal reference bar 10 forms a T with vertical support element 11. The horizontal reference member is preferably provided with lights 12 for night visibility and desirably is painted with a fluorescent orange safety paint for maximum daylight visibility.

Vertical support 11 is welded or otherwise attached at a right angle to plate support element 13. Plate support element 13 has front and back depending flanges 14 which are overlapped by the upper portions of front and back walls 15 of lower housing 16. The support plate element 13 is pivotably mounted to housing 16 by means of co-axially aligned pivot pins 17 which connect flanges 14 with the front and back walls 15 of housing 16.

In view of this structure, it will be seen that horizontal reference bar 10 mounted on vertical support 11 may be pivoted about point 17 and thus may be maintained in a substantially horizontal position despite the roll of the ship's surface 18 to which housing 16 is fastened.

Adjustment of the position of horizontal reference bar 10 is preferably accomplished by means of a gyro, such as the ship's gyro 19, which generates an electric signal in response to roll of the ship. The electric signal is amplified in amplifier 20 and the output of amplifier 20 is used to direct reversible motor 21. The drive shaft 22 of motor 21 is suitably coupled to a drive gear 23 by belt 25. Drive gear 23 cooperates with a semicircular gear 24 which is mounted beneath platform 13.

Reversible motor 21 is powered by an independent power source, not shown in the drawing, such as a conventional 110 volt source. The amplified signal from the gyro is used to direct the motor, in known manner so that the drive gear 23 drives gear 24 in the desired direction to maintain reference bar 10 in a substantially horizontal position.

In operation, the roll of the ship causes an electric signal to be generated in gyro 19. The electric signal is amplified in amplifier 20 and used to power reversible motor 21 in the appropriate direction. The motion of the motor drive-shaft 22 is transmitted to gear 23 which drives semicircular gear 24 in the desired direction. Movement of the gear is directly transmitted to platform 13 to which it is attached causing movement of vertical support 11 and the attached horizontal reference bar 10 to compensate for roll of the ship.

Figure 2:
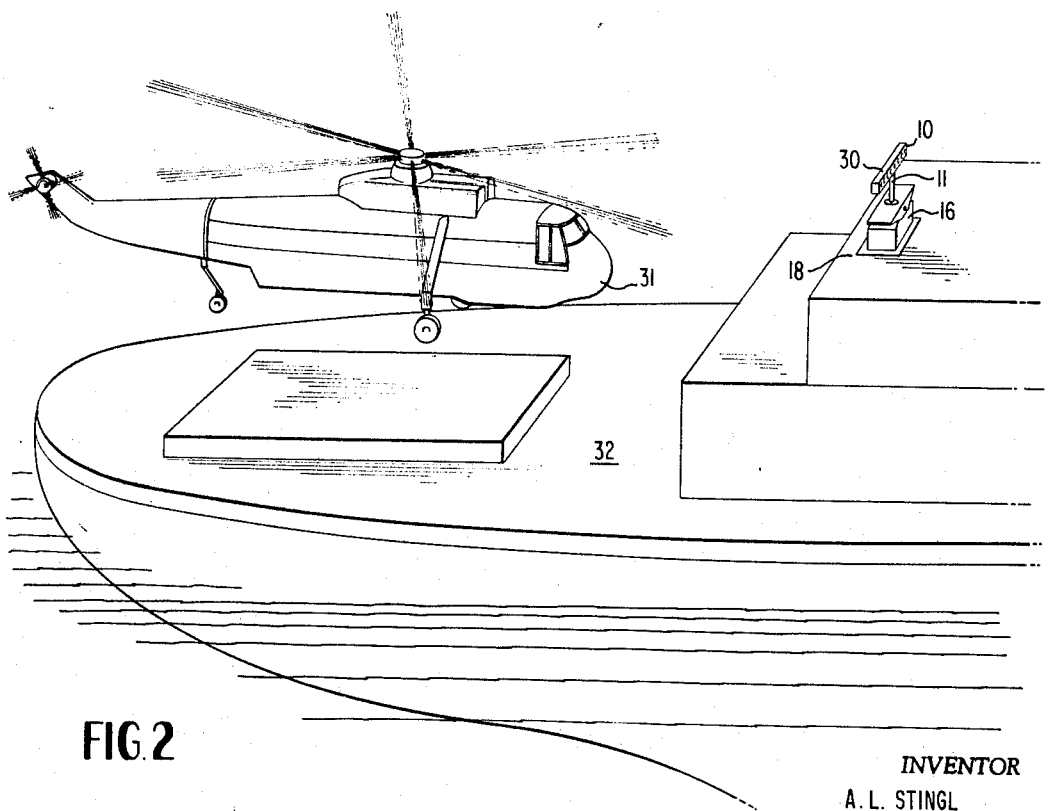
FIGURE 2 is a perspective view of the overall system where the horizontal reference bar is mounted on the structure of a ship at sea in view of the pilot of a VTOL aircraft hovering above a portion of the deck of the ship.

As will be seen by reference to FIGURE 2, flying a VTOL aircraft, such as helicopter 31 in hovering position or in the course of landing on a ship's deck 32, the efficiency and safety of the operation is immeasurably enhanced by enabling the pilot to fly the aircraft in a substantially horizontal position by reference to horizontal member 10, irrespective of the attitude of the ship. The overall apparatus 30 comprising the T-form member composed of horizontal reference element 10 and vertical support 11 pivotably mounted on housing 16 is conveniently installed on a portion of the ship's superstructure 18 so that the pilot may readily keep it in view despite pitching and rolling of the ship.

While the use of the ship's gyro or other separately provided gyro is the most convenient method for stabilizing the horizontal reference bar, a gravity means, such as a weight depending from pivoted vertical support 11 or other suitable stabilizing means may likewise be used.

What is claimed is:

1. A system for assisting the flying of vertical take-off and landing aircraft relative to a ship at sea comprising:
   a substantially horizontal reference member mounted on said ship in view of the pilot of said aircraft,
   gyro-controlled stabilizing means responsive to the roll of said ship for stabilizing said horizontal reference member in a substantially horizontal position so that said pilot may fly said aircraft in a substantially horizontal attitude by reference to said horizontal member, irrespective of the position of said ship,
   said horizontal reference member being the horizontal component of a T-form element, the vertical component of which is secured normal to the surface of a support plate pivotally mounted about an axis passing through the plane of said plate and under the control of said stabilizing means.

2. The system of claim 1 wherein said plate is pivoted about said axis by a drive gear which is coupled to a stationary gear attached to said plate, and said drive gear is driven by a gyro directed motor.

References Cited

UNITED STATES PATENTS

| | | | |
|---|---|---|---|
| 2,784,925 | 3/1957 | Goodhart | 33—46 X |
| 3,003,451 | 10/1961 | Lundin et al. | 244—114 X |
| 3,091,751 | 5/1963 | Greenberg | 114—43.5 X |
| 3,279,406 | 10/1966 | Ricketts et al. | 114—43.5 |

WILLIAM D. MARTIN, JR., Primary Examiner

U.S. Cl. X.R.

33—74; 114—43.5